(12) United States Patent
Krogh

(10) Patent No.: US 8,678,455 B2
(45) Date of Patent: Mar. 25, 2014

(54) LIFTING FITTING

(75) Inventor: Mikkel Verner Krogh, Brande (DK)

(73) Assignee: Siemens Aktiengesellschaft, Munich (DE)

( * ) Notice: Subject to any disclaimer, the term of this patent is extended or adjusted under 35 U.S.C. 154(b) by 144 days.

(21) Appl. No.: 13/382,947

(22) PCT Filed: Dec. 22, 2009

(86) PCT No.: PCT/EP2009/067714

§ 371 (c)(1),
(2), (4) Date: Jan. 9, 2012

(87) PCT Pub. No.: WO2011/009500

PCT Pub. Date: Jan. 27, 2011

(65) Prior Publication Data

US 2012/0107084 A1    May 3, 2012

Related U.S. Application Data

(60) Provisional application No. 61/228,196, filed on Jul. 24, 2009.

(51) Int. Cl.
*B66C 1/22* (2006.01)
*B66C 1/24* (2006.01)
*B66C 1/62* (2006.01)

(52) U.S. Cl.
USPC ............. 294/67.21; 294/67.5; 294/81.3

(58) Field of Classification Search
USPC ............ 254/133 R, 134; 269/46; 29/281; 294/67.1, 67.2, 67.5; 403/116, 337, 403/354, 209; 410/44
See application file for complete search history.

(56) References Cited

U.S. PATENT DOCUMENTS

| | | | | |
|---|---|---|---|---|
| 2,250,448 A | * | 7/1941 | Edwards | 403/337 |
| 2,664,063 A | * | 12/1953 | Makruski | 269/309 |
| 3,843,185 A | * | 10/1974 | James et al. | 294/67.21 |
| 4,307,877 A | * | 12/1981 | Rogos | 269/46 |

(Continued)

FOREIGN PATENT DOCUMENTS

| | | |
|---|---|---|
| CN | 1882456 A | 12/2006 |
| CN | 101371036 A | 2/2009 |
| CN | 101479179 A | 7/2009 |
| CN | 201268549 Y | 7/2009 |
| WO | WO 2004041589 A1 | 5/2004 |
| WO | WO 2007093854 A2 * | 8/2007 |
| WO | WO 2008000262 A1 | 1/2008 |

*Primary Examiner* — Gregory Adams

(57) ABSTRACT

A lifting fitting for lifting a series of elements of different sizes in a wind turbine is proposed. The lifting fitting has a base plate having at least one central slotted hole shaped to accommodate a fastener for fastening the lifting fitting to an element to be lifted, at least two outer slotted holes each shaped to accommodate a further fastener for fastening the lifting fitting to an element to be lifted. The outer slotted holes are arranged transverse to the central slotted hole. The lifting fitting is connected to a lifting apparatus for lifting the element. A method of assembling the series of elements is proposed. The elements are successively lifted into place. The lifting fitting can be used in the assembly of a wind turbine tower having individually liftable tower sections for lifting the tower sections into place.

10 Claims, 6 Drawing Sheets

(56) References Cited

U.S. PATENT DOCUMENTS

| | | | |
|---|---|---|---|
| 4,433,830 A * | 2/1984 | Campbell | 254/264 |
| 4,534,588 A * | 8/1985 | Markey | 294/81.5 |
| 4,760,997 A * | 8/1988 | Fager | 269/71 |
| 5,303,966 A * | 4/1994 | Robinson | 294/15 |
| 5,339,508 A * | 8/1994 | Ventress | 29/273 |
| 5,687,537 A * | 11/1997 | Noble | 52/849 |
| 5,887,922 A * | 3/1999 | Hendrix et al. | 294/67.5 |
| 6,988,698 B2 * | 1/2006 | O'Neill | 248/323 |
| 2005/0002749 A1 | 1/2005 | Andersen | |

\* cited by examiner

FIG 1
PRIOR ART
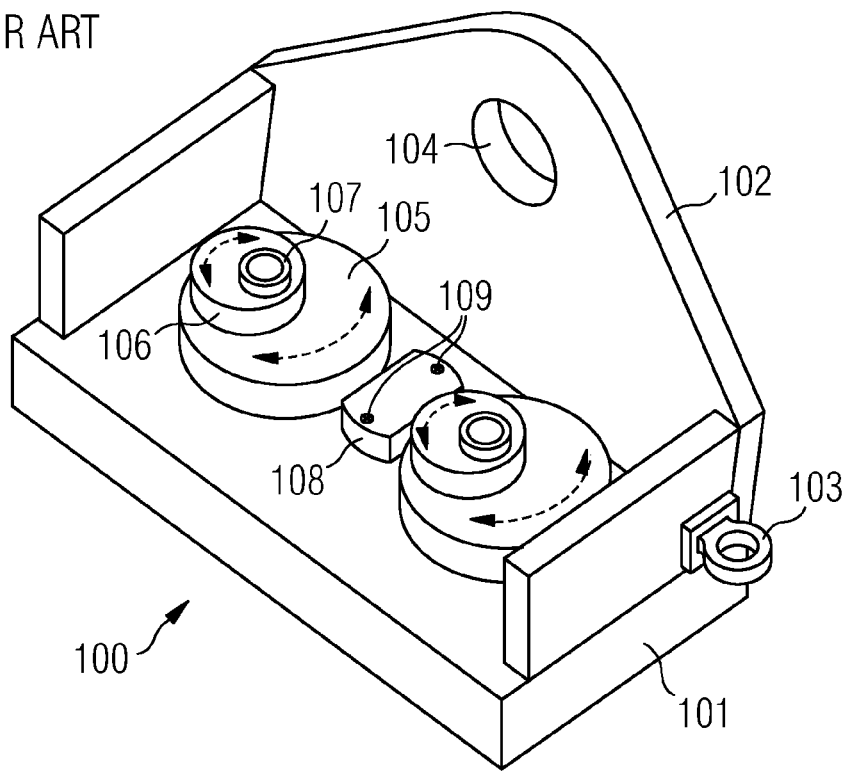
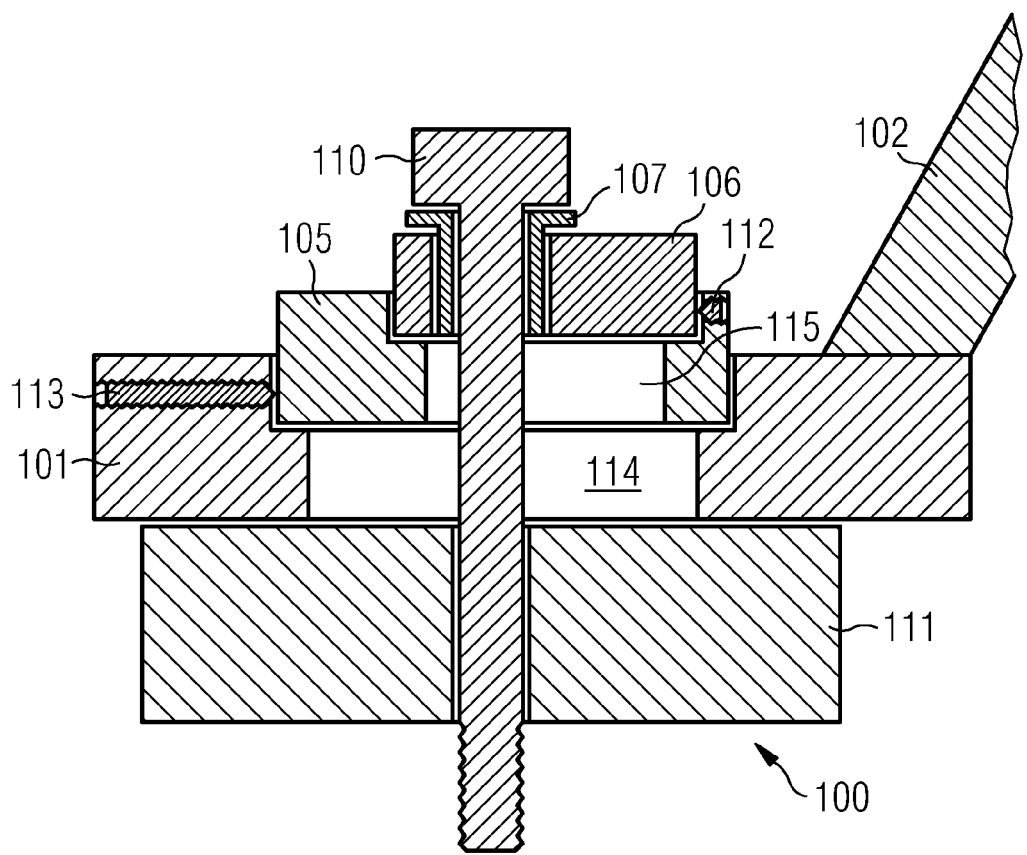

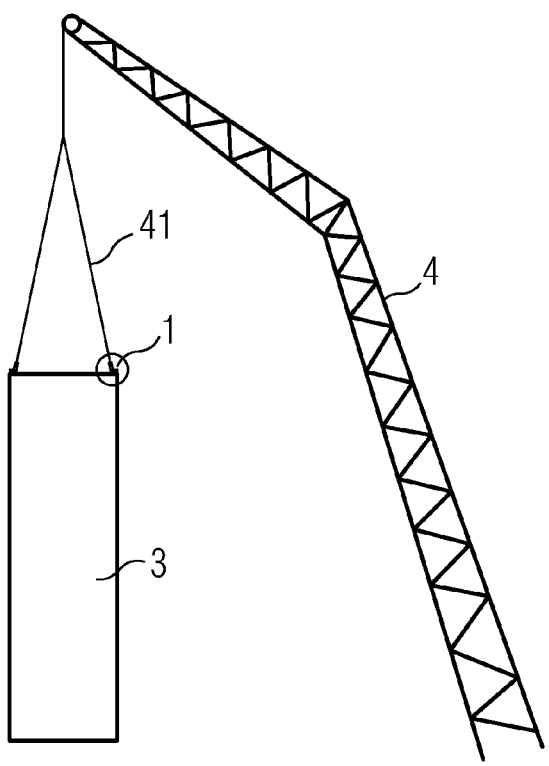
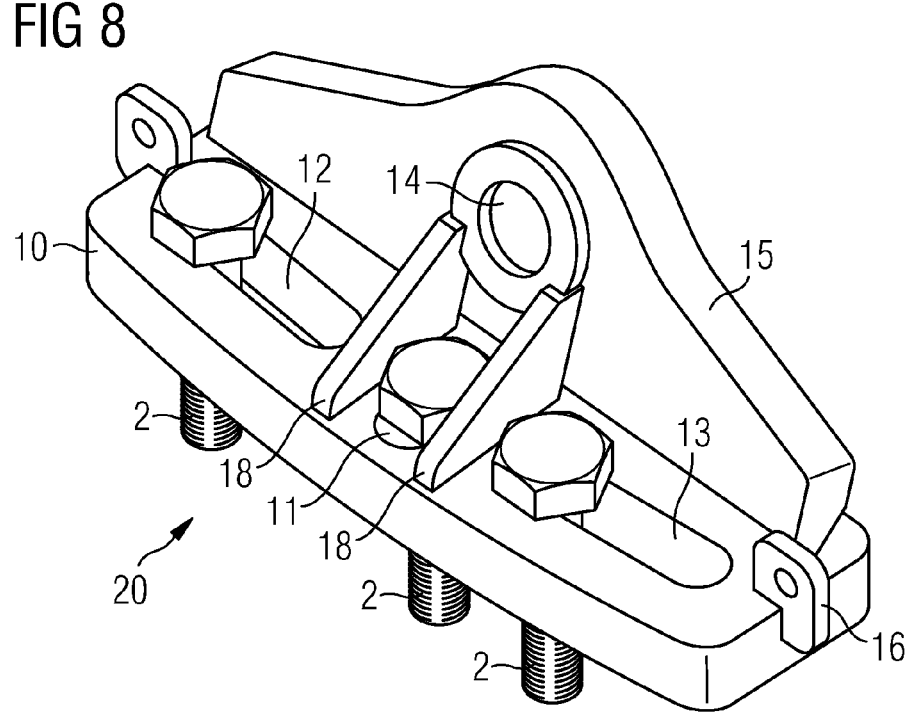

LIFTING FITTING

CROSS REFERENCE TO RELATED APPLICATIONS

This application is the US National Stage of International Application No. PCT/EP2009/067714, filed Dec. 22, 2009 and claims the benefit thereof. The International Application claims the benefits of a provisional patent application filed on Jul. 24, 2009, and assigned application Ser. No. 61/228,196. Both of the applications are incorporated by reference herein in their entirety.

FIELD OF THE INVENTION

The invention describes a lifting fitting for use in lifting a series of elements of different sizes. The invention further describes a method of assembling a series of elements of different sizes. The invention also describes the use of a lifting fitting in the assembly of a tower.

BACKGROUND OF THE INVENTION

Many wind turbines are constructed as hollow steel towers made of prefabricated tower sections. The tower sections, which are generally made of steel and may be several tens of meters in length and several meters in diameter, may be manufactured at one location and then transported horizontally by rail, ship, etc. to their destination location. To prevent damage during transport, the tower sections are generally secured using some suitable type of fixture, as described in WO 2007/093854 A2 and US 2005/0002749 A1. These fixtures make use of the end flanges of each tower section to secure the tower sections to a transport frame or container. Once the tower sections have arrived at their end destination, the tower is constructed or assembled by successively lifting and placing a series of tower sections on top of each other, whereby the lowest tower section is mounted on a foundation, usually made of concrete, and includes access means such as a doorway to later allow access for a maintenance crew. The tower sections become successively smaller in diameter towards the top of the tower. Neighbouring tower sections are connected together by means of fasteners such as construction bolts inserted into connection holes in the end flanges. For example, for a pair of tower sections comprising a 'lower' tower section and an 'upper' tower section, the connection holes of the neighbouring sections are positioned such that connection holes in the top flange of the lower tower section match the connection holes in the bottom flange of the upper tower section.

To lift a tower section, a number of lifting fittings—usually at least two—is mounted to one of the end flanges of the section, usually the upper flange, and a cable is connected to the lifting fittings to allow a crane to hoist the section onto the previously assembled partial tower. However, the successive tower sections differ in diameter owing to the overall conical tower shape, and the spacings between the connection holes therefore also differ. To accommodate these differences, prior art lifting techniques have required multiple lifting fittings, sometimes even a specific lifting fitting for each tower section.

In one approach, WO 2008/000262 A1 describes a lifting fitting designed to be adapted to tower sections of different diameters. In this approach, the adjustability is given by a pair of large openings in the lifting fitting, and a number of sleeves which can be rotated about a fastener inserted through the opening. For stability, this lifting fitting is equipped with an additional strut which must be screwed into place. Furthermore, to ensure that the sleeves do not move during the lifting procedure, the sleeves must be fixed to each bolt by means of a grub screw. While this approach allows the use of a single type of lifting fitting, this fitting requires the use of multiple sleeves, and the process of connecting such fittings to each tower section and then disconnecting them again is extremely time-consuming. The relatively large number of small parts—sleeves, struts, grub screws, etc.—can result in problems if a part is dropped or mislaid. Furthermore, since outdoor construction sites are exposed to all kinds of weather conditions, the small parts may become encrusted with dirt or salt over time, so that they may become jammed or blocked.

SUMMARY OF THE INVENTION

It is therefore an object of the invention to provide a simple lifting fitting which avoids the problems outlined above.

The object of the invention is achieved by the lifting fitting, and by the method of assembling a series of elements, and by the use of such a lifting fitting, according to the claims, in the assembly of a tower.

The inventive lifting fitting, for use in lifting a series of elements of different sizes, comprises a base plate, which base plate comprises at least one central slotted hole shaped to accommodate a fastener for fastening the lifting fitting to an element to be lifted, and at least two outer slotted holes each shaped to accommodate a further fastener for fastening the lifting fitting to the element to be lifted, whereby the outer slotted holes are arranged transverse to the central slotted hole and wherein an outer slotted hole is positioned in the base plate such that a longitudinal axis of the outer slotted hole essentially follows the outline of the element to be lifted. The lifting fitting further comprises a connection means for connecting the lifting fitting to a lifting apparatus for lifting the element.

Here, the term 'longitudinal axis' is to be understood to mean an axis along the length of the slotted hole (viewed from above), and may be, for example, a longitudinal bisector of the slotted hole. In the case of circular elements to be lifted and connected, the outer slotted holes may be slightly curved, or they may simply be arranged at an angle to the central slotted hole, for example to point slightly 'inward'.

The favourable arrangement of the slotted holes allows the inventive lifting fitting to be attached to elements with a wide range of sizes. In the case of circular elements, the lifting fitting can be used to lift into place any element with a diameter in a wide range of diameters. An obvious advantage of the lifting fitting according to the invention is that it comprises essentially only one piece. Also, the lifting fitting itself does not require any adjustment before attaching it to an element to be lifted. Therefore, the assembly process can be completed faster. Furthermore, since the lifting fitting does not require any precisely milled parts such as grub screws or threads, its manufacture is particularly economical and straightforward.

In the method according to the invention of assembling a series of elements of different sizes wherein the elements are successively lifted into place, the method comprises fastening such a lifting fitting to an element to be lifted, connecting a lifting apparatus to the connecting means of the lifting fitting, controlling the lifting apparatus to lift the element onto a predecessor element, and subsequently disconnecting the lifting apparatus from the connecting means of the lifting fitting.

In contrast to prior art lifting fittings, the method according to the invention is particularly straightforward and fast. Since there are no small parts such as sleeves, grub screws etc. to be dismantled, the lifting fitting according to the invention can very quickly be connected to an element to be lifted, and can equally quickly be removed again.

According to the invention, such a lifting fitting is used in the assembly of a tower comprising individually liftable tower sections, preferably for lifting into place a plurality of tower sections of a wind turbine tower.

Particularly advantageous embodiments and features of the invention are given by the dependent claims, as revealed in the following description.

The lifting fitting according to the invention can be used to lift any elements of any shape. Usually, however, for construction projects involving a series of connected elements, the elements will have a cross-section of regular shape, for example a circle in the case of a tower section. Therefore, in a particularly preferred embodiment of the invention, the lifting fitting is dimensioned according to an element with a circular cross-section, for example a hollow element having an essentially circular perimeter wall.

Preferably, the slotted holes of the lifting fitting correspond to holes or openings in an assembly means of the element to be lifted. In the case of a wind turbine tower section or other essentially circular element, an assembly means can be an end flange. Successive pairs of elements can be fastened together by means of fasteners such as bolts inserted through matching openings in the end flanges. Preferably, the slotted holes of the lifting fitting are dimensioned according to the holes in the assembly means of the elements to be lifted. Therefore, in a further preferred embodiment of the invention, the slotted holes are each dimensioned to accommodate a bolt, preferably a threaded bolt, with a size of at least 24 mm, more preferably an M24 bolt according to the ISO metric standards for fasteners. The portion of the bolt shaft that is contained within the lifting fitting and the flange of the elements to be lifted need not be threaded, since only the end of the bolt that protrudes will be covered by a corresponding nut, for example.

The slotted holes can be arranged relative to one another in a number of ways. In this context, the term "transverse" can mean that an outer slotted hole is arranged at an angle to a central slotted hole. For example, a pair of outer slotted holes can be arranged one on each side of one or more central slotted holes, such that the outer slotted holes slant slightly 'inwards', i.e. 'into' the element being lifted. The choice of position for the slotted holes may depend largely on the spacings between the holes in the assembly means, and on the extent to which these spacings vary between the smaller and larger elements to be lifted.

The elements of a series of elements to be lifted may be essentially the same in shape, and may differ only in their relative sizes. For example, a series of circular elements to be lifted may all have the same overall design, while each element is a different size. To connect neighbouring pairs of elements, it is necessary that the holes for the fasteners be arranged appropriately on the top of the 'lower' element and the bottom of the 'upper' element. Evidently, for different pairs of neighbouring elements, the spacings between the holes may also be different. For example, a pair of large elements may be connected using fasteners inserted through holes spaced apart by a first, larger distance. A pair of small elements may be connected using fasteners inserted through holes spaced apart by a second, smaller distance. Furthermore, the pair of large elements may require more fasteners than the pair of small elements, and may therefore have a correspondingly larger number of holes. For example, for a wind turbine tower with a largest diameter of about 5 m and a smallest diameter of about 2.3 m, the lowest pair of tower sections or elements may be joined using about 140 fasteners spaced apart by about 11 cm, while the top pair is joined using only about 45 fasteners spaced apart by about 16 cm.

As already indicated above, the slotted holes can be arranged relative to each other in a number of ways. For example, one central slotted hole might be placed to essentially follow the perimeter of the element to be lifted, and the outer slotted holes might be arranged transversely or perpendicularly to the central slotted hole. However, such an arrangement may be limited to a restricted hole spacing range of the assembly means of the elements or objects to be lifted. Therefore, in a preferred embodiment of the invention, the central slotted hole of the lifting fitting is arranged to extend along a radius of the element to be lifted. In this way, the lifting fitting is given a certain amount of 'play' along the direction of the radius of the element after a fastener has been inserted into the central slotted hole. Since the outer slotted holes are arranged transverse to the central slotted hole, these may essentially follow the perimeter of the element to be lifted.

The slotted holes are preferably positioned in the base plate to coincide with connection holes of the element to be lifted such that a fastener can be inserted through a slotted hole into a connection hole to connect the lifting fitting to the element. Here, the term 'coincide' is to be understood to mean that when the lifting fitting is placed on the element to be lifted, a connection hole is accessible through each of the slotted holes through which a fastener is to be inserted. Evidently, since the slotted holes are larger in area than a connection hole, these will also expose areas adjacent to the connection holes. The required dimensions of the slotted holes can be determined by considering, for example, the range of diameters of the elements to be lifted and the spacings between the connection holes on each of these elements. Optimal shapes for the slotted holes can then be determined.

The lifting fitting may have any suitable number of central slotted holes and outer slotted holes, and the number of slotted holes can also be influenced by the range of element sizes involved. For example, a pair of central slotted holes can be arranged essentially in the centre of the lifting fitting, and can be flanked by an outer slotted hole on each side. In a particularly preferred embodiment of the lifting fitting according to the invention, the lifting fitting comprises a single central slotted hole and two outer slotted holes arranged one on each side of the central slotted hole.

Since the lifting fitting itself will be quite heavy, additional connecting means are preferably arranged on the lifting fitting to assist during handling. For example, lateral eyelets can be positioned on the outer sides of the base plate to allow the lifting fitting to be raised and lowered easily and safely using a crane. In the assembly of a wind turbine tower, the tower sections are transported horizontally to the site. The lifting fitting can be connected to the crane using a cable passed through the smaller lateral eyelets, and raised up by the required height (in the order of a few meters) where a worker can connect it to the element to be lifted using appropriate fasteners before releasing the cable.

While a single lifting fitting could conceivably be used to lift an element into position, the element would not be suspended vertically, so that its placement may be more time-consuming and possibly also more dangerous. Therefore, in a preferred embodiment of the method according to the invention, a pair of lifting fittings is fastened at essentially diametrically opposed points on an upper side of the element to be lifted.

The lifting fitting, when used to lift large and heavy elements, is preferably equipped with some suitable means for attaching it to a hoisting apparatus such as industrial crane rigging. Therefore, in a further preferred embodiment of the invention, the connection means of the lifting fitting preferably comprises an eyelet or other suitable through-opening in the side wall for connecting a lifting cable or a shackle. The eyelet is preferably dimensioned to accommodate a cable or shackle that is large enough to bear the weight of the largest element to be lifted. The eyelet can preferably be reinforced by a grommet or other suitable means to reduce wear on both eyelet and cable or shackle. Once the lifting fitting has been connected by a worker as described above to the element to be lifted, a steel cable or other lifting means can be connected, for example by means of a shackle, to the lifting fitting through the eyelet. Thereafter, the element can be raised up and hoisted into place. Once the element is in place, a worker can connect the lower part of this element to the upper part of a predecessor element and then proceed to disconnect the lifting fittings.

Usually, a pair of lifting fittings is used in hoisting an element into place, and these are preferably arranged at opposite sides of the element. For optimal load-distribution, the eyelet or connecting means is preferably located in a side wall arranged at an angle to the base plate.

The lifting fitting according to the invention can suit any diameter of the series of circular elements to be lifted. Since the largest elements are also generally the heaviest, the lifting fitting is preferably constructed to bear the heaviest load. Therefore, in a further preferred embodiment of the invention, the lifting fitting preferably comprises a number of stiffening plates. These can be incorporated into the overall lifting fitting in any suitable fashion. For example, suitable stiffening plates may be welded at essentially right angles to the base plate and the side wall on either side of the central slotted hole. The stiffening plates thus provide an additional reinforcement to the lifting fitting. Since the material of the lifting fitting may be any kind of suitable steel such as construction steel, such additional reinforcements can be added at any time. A lifting fitting that has been used in the past in the assembly of towers may be 'upgraded' by welding additional stiffening plates if it is to be used in the future in the assembly of a larger tower with heavier tower sections.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

FIG. 1 shows a prior art lifting fitting;

FIG. 7 shows a crane lifting a wind turbine tower element with the aid of the lifting fitting according to the invention;

FIG. 8 shows a second embodiment of the lifting fitting according to the invention;

DETAILED DESCRIPTION OF THE INVENTION

Figure 2:
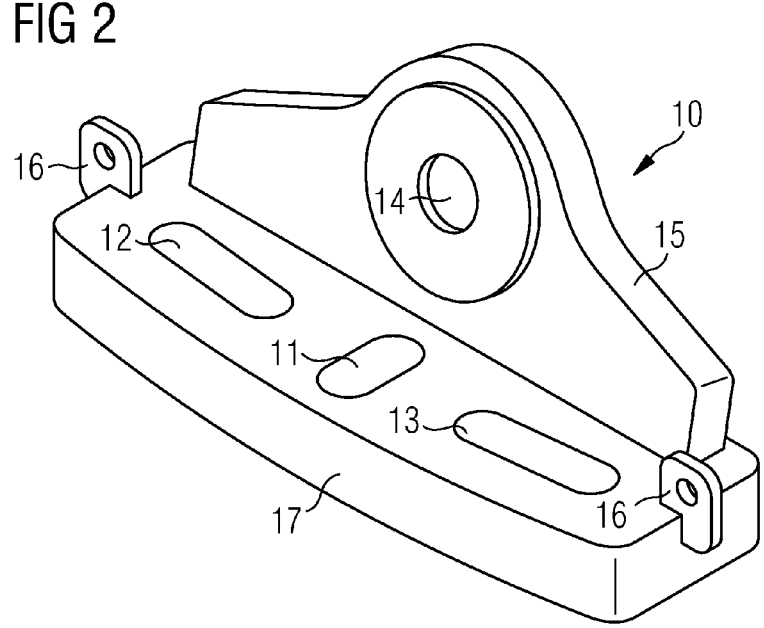
FIG. 2 shows a first embodiment of a lifting fitting according to the invention.

In the drawings, like reference numbers refer to like objects throughout. Objects in the diagrams are not necessarily drawn to scale.

FIG. 1 shows a prior art lifting fitting 100 as described in WO 2008/000262 A1, showing clearly the complex arrangement of parts used in this approach to a universal lifting fitting. The top part of the diagram shows a side elevation of the lifting fitting 100 without a bolt, and the bottom section shows a cross-section with a bolt 110 connecting the lifting fitting 100 to a tower section 111.

This lifting fitting 100 comprises a base plate 101, a side wall 102, an eyelet 103 for handling, and an opening 104 through which a shackle can be attached for lifting. To adjust for different sizes of circular tower sections, this lifting fitting 100 has two relatively large openings 114 in the base plate. The cross-section shows one such opening 114. The opening 114 is several times larger than the bolt 110. To hold the bolt 110, the lifting fitting 100 requires adjusting sleeves 105, 106 and a bush 107. The larger adjusting sleeve 105 also has a relatively large opening 115. The smaller sleeve 106 has a hole to accommodate the bush 107. The sleeves 105, 106 can be rotated so that the bolt 110, when inserted, can be positioned through these openings 114, 115 and inserted into a corresponding hole in the part to be connected 111. However, the sleeves must be screwed tight before the fitting is subject to load, otherwise they would be free to move and the bolt would be subject to shear stress and may fail. The necessary tightening is done using grub screws 112, 113 to fix the sleeves 106, 105 respectively. A third attachment point is given by a strut 108, which must be screwed tight using screws 109.

While this prior art lifting fitting 100 can be attached to circular tower sections of various different diameters, it will be clear to the skilled person that attaching this lifting fitting 100 is a time-consuming operation. Not only are there are large number of parts 105, 106, 107, 108, 109, 112, 113 to be kept track of, the tightening (and subsequent loosening) of the sleeves 105, 106 with grub screws 112, 113 is awkward and slow. Furthermore, when dismounting the lifting fitting 100 after connecting one tower section and in preparation for lifting the next section, there is a danger that one or more of the relatively small parts 105, 106, 107, 108, 109, 112, 113 is dropped or mislaid, leading to delays in assembly.

FIG. 2 shows a first embodiment of a lifting fitting 10 according to the invention. This lifting fitting 10 comprises a base plate 17 and a side wall 15 with a connecting means 14 in the form of an opening 14 or eyelet 14 for connection to a shackle and lifting apparatus. A pair of smaller eyelets 16 located at either end of the side wall 15 is used in handling the fitting 10 during connection to a part to be lifted.

The lifting fitting 10 according to the invention is shown to have a first slotted hole 11 and two further slotted holes 12, 13 facing away from the first slotted hole 11. This arrangement allows degrees of freedom in essentially two directions for bolts inserted through these slotted holes 11, 12, 13.

Figure 3:
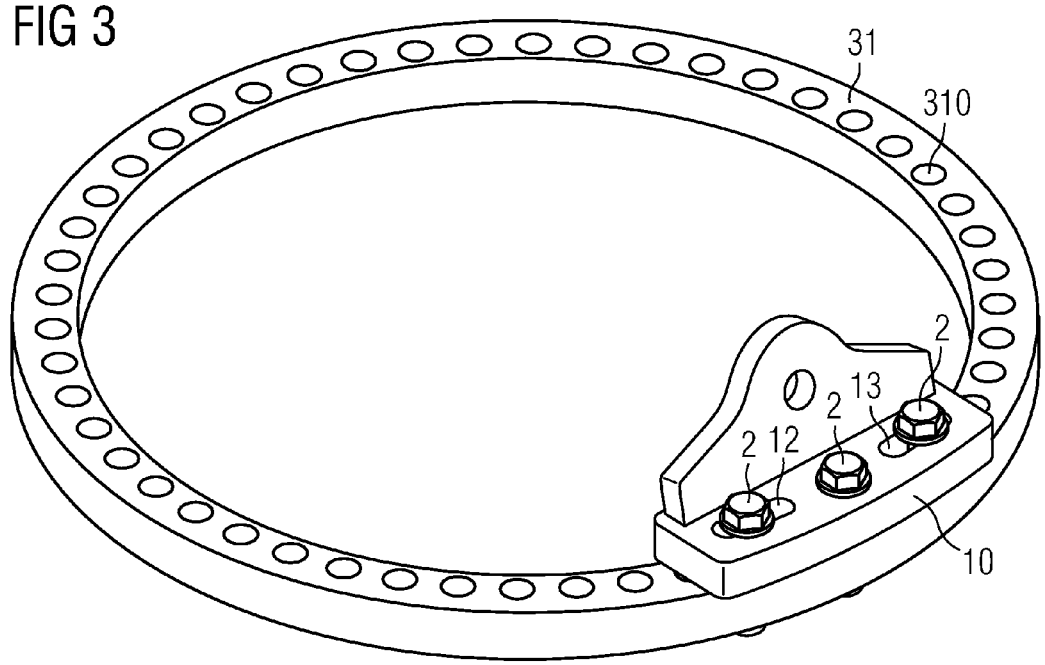
FIG. 3 shows the lifting fitting of FIG. 2 connected to a part to be lifted.

This is illustrated with the aid of the following figures. In FIG. 3, the lifting fitting 10 is shown connected to an assembly means 31 or flange 31 of a circular tower section. For the sake of simplicity, only the flange 31 is shown. A series of holes 310 is arranged around the flange 31 for the bolts which will connect this tower section to a neighbouring section. Six of these holes will be used to attach two lifting fittings 10 so that the tower section can be raised by a lifting apparatus onto a foundation or onto another previously positioned tower section. The diagram shows a single lifting fitting 10 already in place. Three bolts 2 are used to connect the lifting fitting 10 to the flange 31. As the diagram clearly illustrates, no other adapting parts are required. The bolts can be fastened on the underside of the flange in the usual manner using appropriate nuts (not shown in the diagram). The favourable arrangement of the slotted holes 11, 12, 13 with respect to each other is sufficient to allow enough 'play' for the bolts to be inserted into the appropriate flange holes 310.

Figure 4:
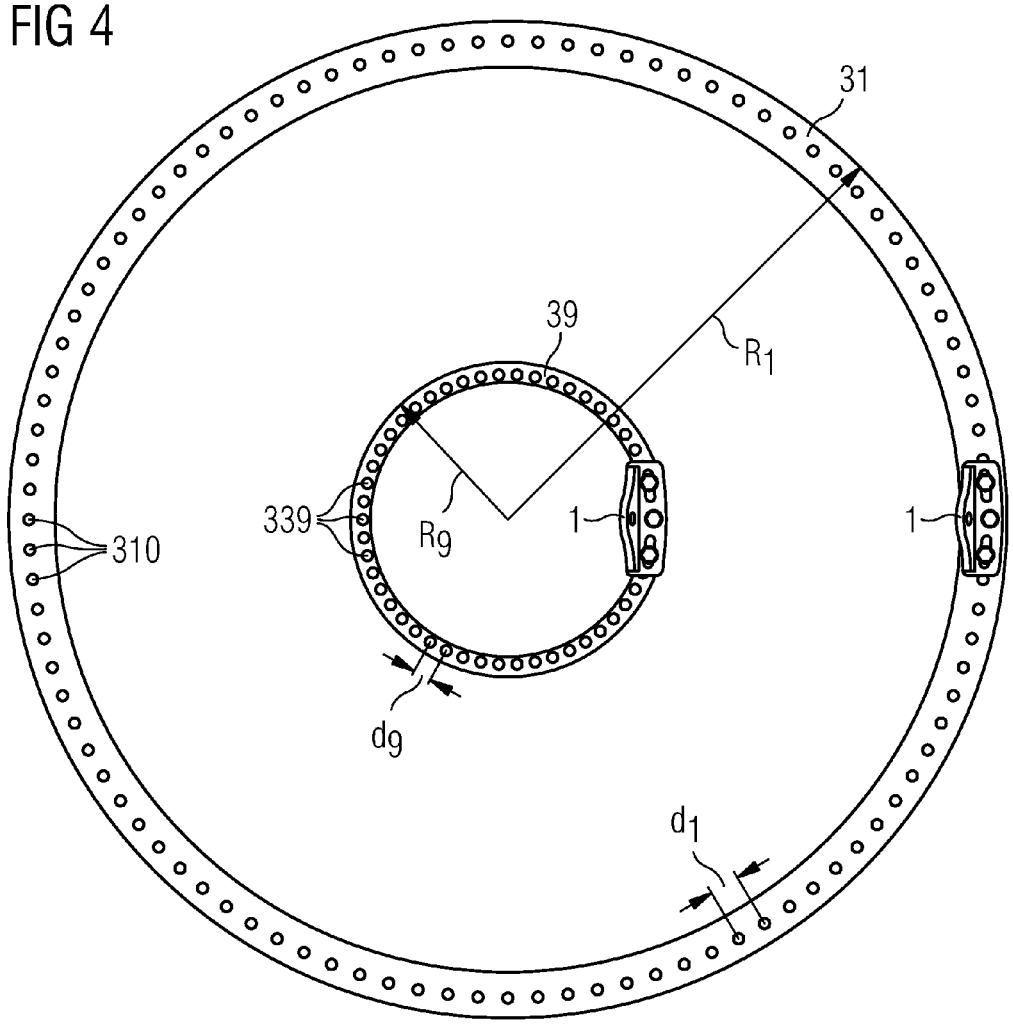
FIG. 4 shows the lifting fitting of FIG. 2 connected to different sized parts to be lifted.

FIG. 4 shows that a single lifting fitting 10, without requiring any additional adjusting parts, can be used for a wide range of flange sizes. The larger flange 31 (corresponding to a lower tower section) has a radius $R_1$ of 2.5 m and an arrangement of holes 310 spaced apart by a distance $d_1$ of 15 cm. A smaller flange 39 (corresponding to an upper tower section) has a radius $R_9$ of 1.25 m and an arrangement of holes 390 spaced apart by a distance $d_9$ of 14 cm. Obviously, the curvature of the smaller flange 39 is more pronounced and the holes 390 are spaced closer together. The lifting fitting 10 can accommodate these differences on account of the favourable arrangement of the slotted holes 11, 12, 13. For the larger flange 31, the bolts 2 are inserted into three neighbouring holes 310, as indicated on the left-hand side of the flange 31 for the placement of a diametrically opposite second lifting fitting 10. For the smaller flange 39, the bolts 2 are inserted through alternate holes 390, as indicated on the left-hand side of the flange 39 for the placement of a second lifting fitting for the small flange 39. As can be seen in the diagram, even though the lifting fitting 10 is relatively small compared to the large flange 31 and relatively large compared to the size of the small flange 39, the favourable placement of the slotted holes in the base plate of the lifting fitting 10 allow this to be easily and securely connected to the different sized flanges 31, 39.

Figure 5:
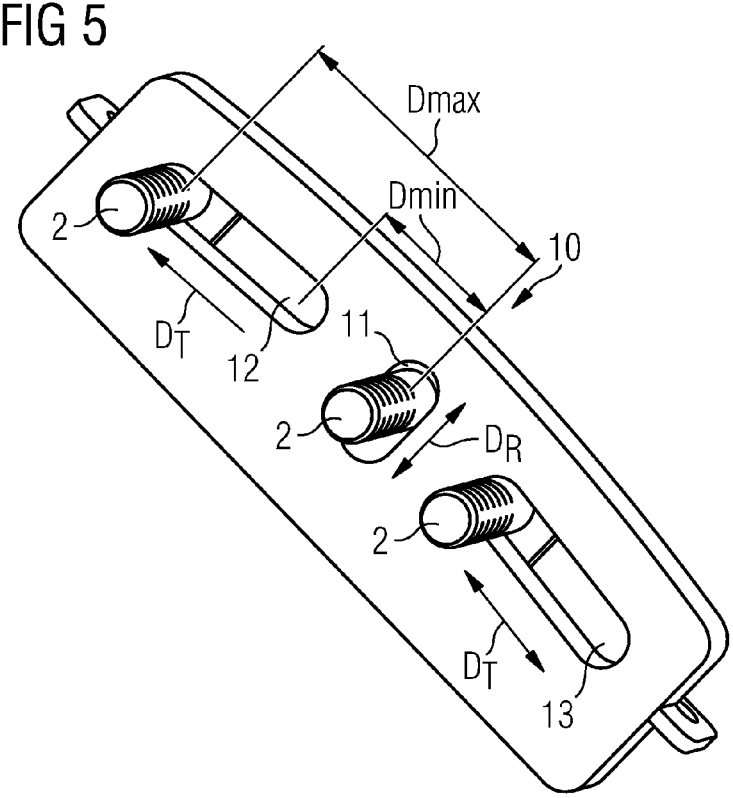
FIG. 5 illustrates the degrees of freedom in placement of the lifting fitting of FIG. 2.

FIG. 5 illustrates the degrees of freedom in placement of the lifting fitting 10. Here, the fitting 10 is viewed from below, and three bolts 2 are shown to be inserted through the slotted holes 11, 12, 13. The bolt 2 in the central slotted hole 11 is free to move in the direction $D_R$, which corresponds to a radial direction, i.e. to a radius of the circular part to which this fitting 10 can be connected. The bolts 2 in the outer slotted holes 12, 13 are free to move in the directions $D_{T1}$, $D_{T2}$ respectively, i.e. tangentially to a circumference or perimeter of the circular part. The diagram also shows that the bolts 2 in the outer slotted holes 12, 13 need not be placed symmetrically, i.e. one bolt 2 can be placed towards the centre of the fitting 10, while the other bolt 2 is placed further outward. Obviously, any combination of positions for the bolts 2 in the three holes 11, 12, 13 is permissible, and the actual arrangement will depend only on the dimensions (radius, hole separation) of the part to be lifted. The range in hole spacings which can be dealt with by this lifting fitting 10 is bounded by the smallest distance and the largest distance between two bolts inserted into two of the slotted holes 11, 12, 13. In this embodiment, therefore, the smallest conceivable distance is given by $D_{min}$, when one bolt is placed into the central slotted hole 11, and a second bolt is placed in one of the outer slotted holes 12, 13 at the end closest to the central slotted hole 11. The largest conceivable distance is given by $D_{max}$, when two bolts are placed into the outermost ends of the outer slotted holes 12, 13. Depending on the weight of the element to be lifted, these distances $D_{min}$, $D_{max}$ can effectively be doubled by placing bolts into the inner corners of the outer slotted holes 12, 13 only, or into the outer corners of the outer slotted holes 12, 13 respectively. Whether this latter arrangement would be used would depend very much on the weight of the object being lifted. Another important aspect of the lifting fitting 10 according to the invention is shown here, namely that the slotted holes 11, 12, 13 need only be marginally wider that the diameter of the bolts 2. This ensures the necessary structural strength of the lifting fitting 10. Furthermore, since the exposed length of the bolt 2 is favourably small, the neck of the bolt 2 is not subject to high shear forces during lifting, as may be the case with the bolts used in the prior art fitting.

Figure 6:
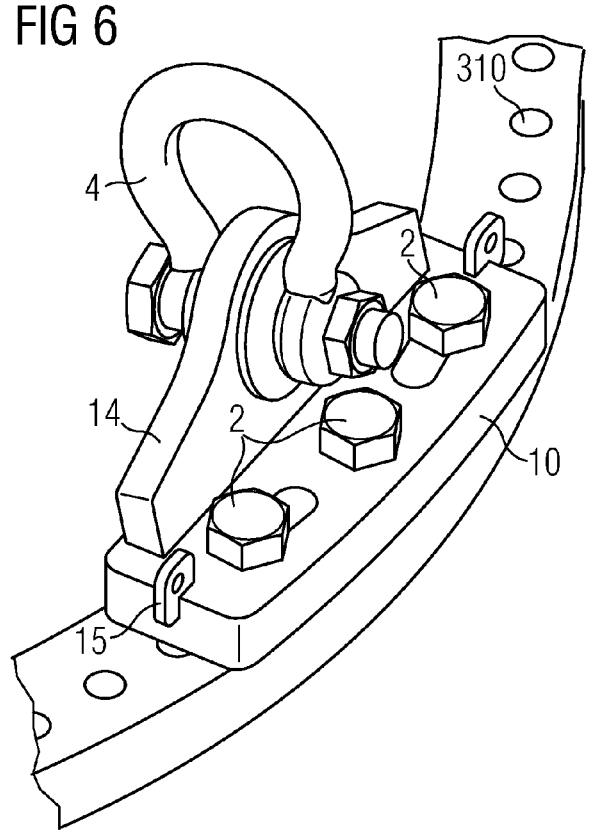
FIG. 6 shows a shackle connected to the lifting fitting of FIG. 2.

FIG. 6 shows another view of the lifting fitting 10, and shows a shackle 4 connected through the hole in the side wall 15. A steel cable 41 of suitable thickness can be connected through the shackle 42 for lifting the tower element 3 as shown in FIG. 7, which is a very simplified illustration of a tower section 3 being lifted by a crane 4. Here, two lifting fittings 10 have been connected to the flanges of the tower section, and a cable 41 has been attached through the shackles 42 of the lifting fittings 10. The crane 4 hoists the tower section 3 onto a lower part, which is either a foundation or a previous (slightly larger) tower section (these lower parts are not shown in the diagram, but it will be clear to the skilled person what is meant). Construction workers then connect this tower section 3 to the part underneath it by fastening bolts in the flange holes. Once the tower section is correctly fastened to the part underneath, the lifting fittings 10 can be disconnected and used for the next element to be lifted.

FIG. 8 shows a second embodiment of the lifting fitting 20 according to the invention. Here, the lifting fitting 20 is further strengthened by stiffening plates 18 around the central slotted hole 11. Such stiffening plates 18 may be desired when the lifting fitting 20 is used to lift very large or heavy elements. Alternatively, the presence of the stiffening plates 18 can mean that the base-plate 18 and side wall 15 of the lifting fitting 20 need not be as thick as in the first embodiment described above. The stiffening plates 17 can be welded into place. In the arrangement shown, if the stiffening plates 18 are placed close enough to each other, these can act as a type of retainer for the bolthead, and the bolt 2 in the central slotted hole can be tightened by turning the nut on the underside of the flange (not shown). Alternatively, the stiffening plates 18 could be placed further apart to allow access to the bolthead in order to apply a tool during tightening.

Figure 9:
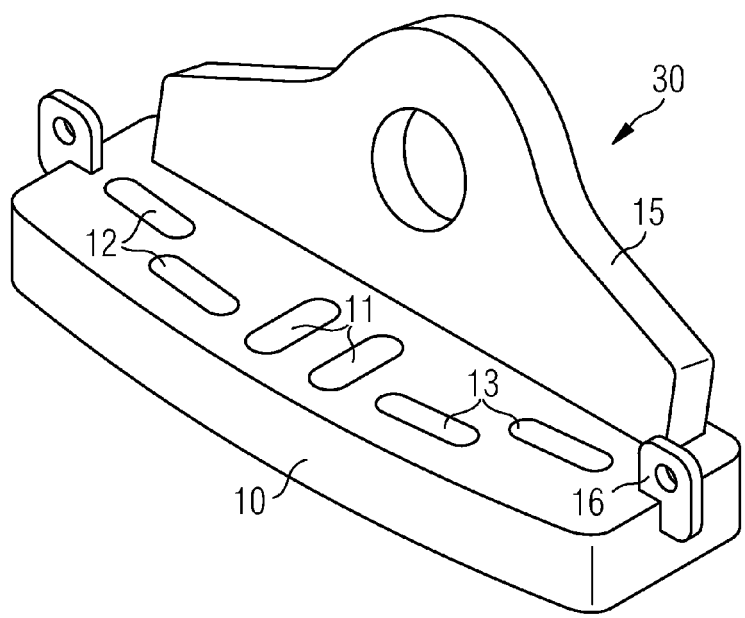
FIG. 9 shows a third embodiment of the lifting fitting according to the invention.

FIG. 9 shows a third embodiment of the lifting fitting 30 according to the invention. Here, the lifting fitting 30 has two central slotted holes 11, and this pair of central slotted holes 11 is flanked on both sides by a pair of outer slotted holes 12, 13. This arrangement of slotted holes 11, 12, 13 may allow a greater range of differences in the sizes of the elements to be lifted by the lifting fitting 30, or may allow the lifting fitting 30 to be used with elements having assembly means with widely varying or even irregular hole spacings.

Although the present invention has been disclosed in the form of preferred embodiments and variations thereon, it will be understood that numerous additional modifications and variations could be made thereto without departing from the scope of the invention. While the assembly of wind turbine towers made of steel tower sections was used as a basis for the description, the lifting fitting according to the invention may be used to good effect in assembling constructions other than steel towers. For example, prefabricated concrete tower sections could also be assembled using a lifting fitting according to the invention, for example pillars for a cable-car, piers for a bridge, etc. Also, the lifting fitting according to the invention is not limited to vertical constructions, but could also be used in the assembly of horizontal constructions such as pipelines, sewage pipes, etc.

For the sake of clarity, it is to be understood that the use of "a" or "an" throughout this application does not exclude a plurality, and "comprising" does not exclude other steps or elements. A "unit" or "module" can comprise a number of units or modules, unless otherwise stated.

The invention claimed is:

1. A lifting fitting for lifting an element into a place in a wind turbine, the element comprising a circular cross section with a flange arranged on at least a portion of cross section such that an arc shaped flange with a plurality of holes is provided at the cross section, comprising:
    a connection opening adapted to attach to a lifting apparatus such that the element is lifted when the lifting apparatus is operated; and
    a base plate effective to attach to the arc shaped flange, comprising:
        at least one central slotted hole shaped to accommodate a fastener for fastening the lifting fitting to the flange, and
        at least two outer slotted holes each shaped to accommodate a further fastener for fastening the lifting fitting to the flange,
    wherein the central slotted hole and the two outer slotted holes are arranged and shaped such that the faster and further fasteners are accommodated along an arc corresponding to the arc shaped flange and effective to accommodate the arc formed from cross sections having different radii,
    wherein the central slotted hole is extended along a radius of the circular cross section,
    wherein the outer slotted holes are arranged transverse to the central slotted hole, and
    wherein each of the outer slotted holes is positioned in the base plate such that a longitudinal axis of each of the outer slotted holes essentially follows an arc outline of the flange and effective to attach to an arc shaped flange.

2. The lifting fitting as claimed in claim 1, wherein the central slotted hole and the outer slotted holes are each dimensioned to accommodate a bolt with a size of at least M24.

3. The lifting fitting as claimed in claim 1, wherein the central slotted hole and the outer slotted holes each is positioned in the base plate to coincide with a connection hole of the element such that the fastener and the further fastener each can be inserted through the central slotted hole and the outer slotted holes respectively into the connection hole to connect the lifting fitting to the element.

4. The lifting fitting as claimed in claim 1, wherein the connection opening comprises an eyelet for attaching the lifting fitting to the lifting apparatus.

5. The lifting fitting as claimed in claim 1, further comprising
    a side wall arranged and arranged at an angle to the base plate,
    wherein the connection opening is located in the side wall.

6. The lifting fitting as claimed in claim 5, further comprising at least one additional stiffening element attached to the base plate and to the side wall in order to add stiffness to the base plate and side wall.

7. The lifting fitting as claimed in claim 1, wherein the lifting fitting comprises a single central slotted hole and two outer slotted holes each arranged on each side of the central slotted hole.

8. A method for lifting an element into a place in a wind turbine, comprising:
    fastening the lifting fitting according to claim 1 to the element;
    connecting a lifting apparatus to the connection of the lifting fitting;
    controlling the lifting apparatus to lift the element onto a predecessor element; and
    disconnecting the lifting apparatus from the connection of the lifting fitting.

9. The method as claimed in claim 8, wherein a pair of lifting fittings are fastened at essentially diametrically opposed points on an upper side of the element.

10. The method as claimed in claim 8, successively lifting a plurality of elements into place using the lifting fitting in order to assemble a tower of the wind turbine wherein each element is a tower section and each element has a different radius for the circular cross section.

* * * * *